US012460581B2

(12) United States Patent
Gharagozloo et al.

(10) Patent No.: US 12,460,581 B2
(45) Date of Patent: Nov. 4, 2025

(54) METHOD AND SYSTEM FOR MITIGATING CORROSION AND/OR EROSION IN AN AIRCRAFT ENGINE

(71) Applicant: PRATT & WHITNEY CANADA CORP., Longueuil (CA)

(72) Inventors: Alireza Gharagozloo, Boucherville (CA); Roja Tabar, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 231 days.

(21) Appl. No.: 18/070,571

(22) Filed: Nov. 29, 2022

(65) Prior Publication Data
US 2024/0175398 A1 May 30, 2024

(51) Int. Cl.
*F02C 7/30* (2006.01)
*F01D 25/00* (2006.01)
*F01D 25/32* (2006.01)

(52) U.S. Cl.
CPC .............. *F02C 7/30* (2013.01); *F01D 25/002* (2013.01); *F01D 25/32* (2013.01);
(Continued)

(58) Field of Classification Search
CPC .......... F01D 25/002; F01D 25/32; F02C 7/30; F05D 2220/323; F05D 2230/72; F05D 2260/607; F05D 2260/80; F05D 2260/08; F05D 2260/95; F05D 2270/11; G05B 23/024; G05B 23/0283; G05B 2219/45071
See application file for complete search history.

(56) References Cited

U.S. PATENT DOCUMENTS

| 7,020,595 B1 * | 3/2006 | Adibhatla | .......... | G05B 23/0254 |
| | | | | 714/25 |
| 10,239,640 B2 | 3/2019 | Ethington et al. | | |

(Continued)

FOREIGN PATENT DOCUMENTS

| EP | 1914010 A2 | 4/2008 |
| EP | 2180146 A2 | 4/2010 |
| EP | 3179392 A1 | 6/2017 |

OTHER PUBLICATIONS

European Patent Office, Communication re. extended European search report for European patent application No. 23213090.6 dated Mar. 6, 2024.

*Primary Examiner* — Michael J Dalbo
(74) *Attorney, Agent, or Firm* — Norton Rose Fulbright Canada LLP

(57) ABSTRACT

Methods and systems for mitigating corrosion and/or erosion in an aircraft engine are provided. A method includes receiving usage data characterizing a medium accumulated inside the aircraft engine. Using a trained model, the usage data is related to an assigned aircraft engine condition from a plurality of aircraft engine conditions. The trained model is trained using machine learning and historical data relating characteristics of the medium to the plurality of aircraft engine conditions. When the assigned aircraft engine condition is indicative of a corrosion risk for the aircraft engine, a corrosion-mitigating action is initiated for the aircraft engine. When the assigned aircraft engine condition is indicative of an erosion risk for the aircraft engine, an erosion-mitigating action is initiated for the aircraft engine.

20 Claims, 6 Drawing Sheets

(52) U.S. Cl.
CPC .... *F05D 2220/323* (2013.01); *F05D 2260/80* (2013.01); *F05D 2260/95* (2013.01)

(56) References Cited

U.S. PATENT DOCUMENTS

| | | |
|---|---|---|
| 10,678,969 B2 | 6/2020 | Stevens et al. |
| 10,906,670 B2 | 2/2021 | Sachdeva et al. |
| 11,268,449 B2 | 3/2022 | Escriche et al. |
| 2008/0173330 A1* | 7/2008 | Wagner .................... B08B 3/00 134/113 |
| 2010/0102835 A1* | 4/2010 | Chillar ................. F01D 25/002 324/700 |
| 2017/0356346 A1* | 12/2017 | Jiang .................. F04D 27/0292 |
| 2018/0010481 A1 | 1/2018 | Dauenhauer et al. |
| 2018/0245477 A1* | 8/2018 | Kulkarni ............... F01D 25/002 |
| 2019/0093505 A1 | 3/2019 | Escriche et al. |
| 2020/0079532 A1* | 3/2020 | Rix ........................ B64D 45/00 |
| 2020/0131996 A1* | 4/2020 | Hanlon ................. F04D 27/001 |
| 2021/0148246 A1 | 5/2021 | Thirumalasetty |

\* cited by examiner

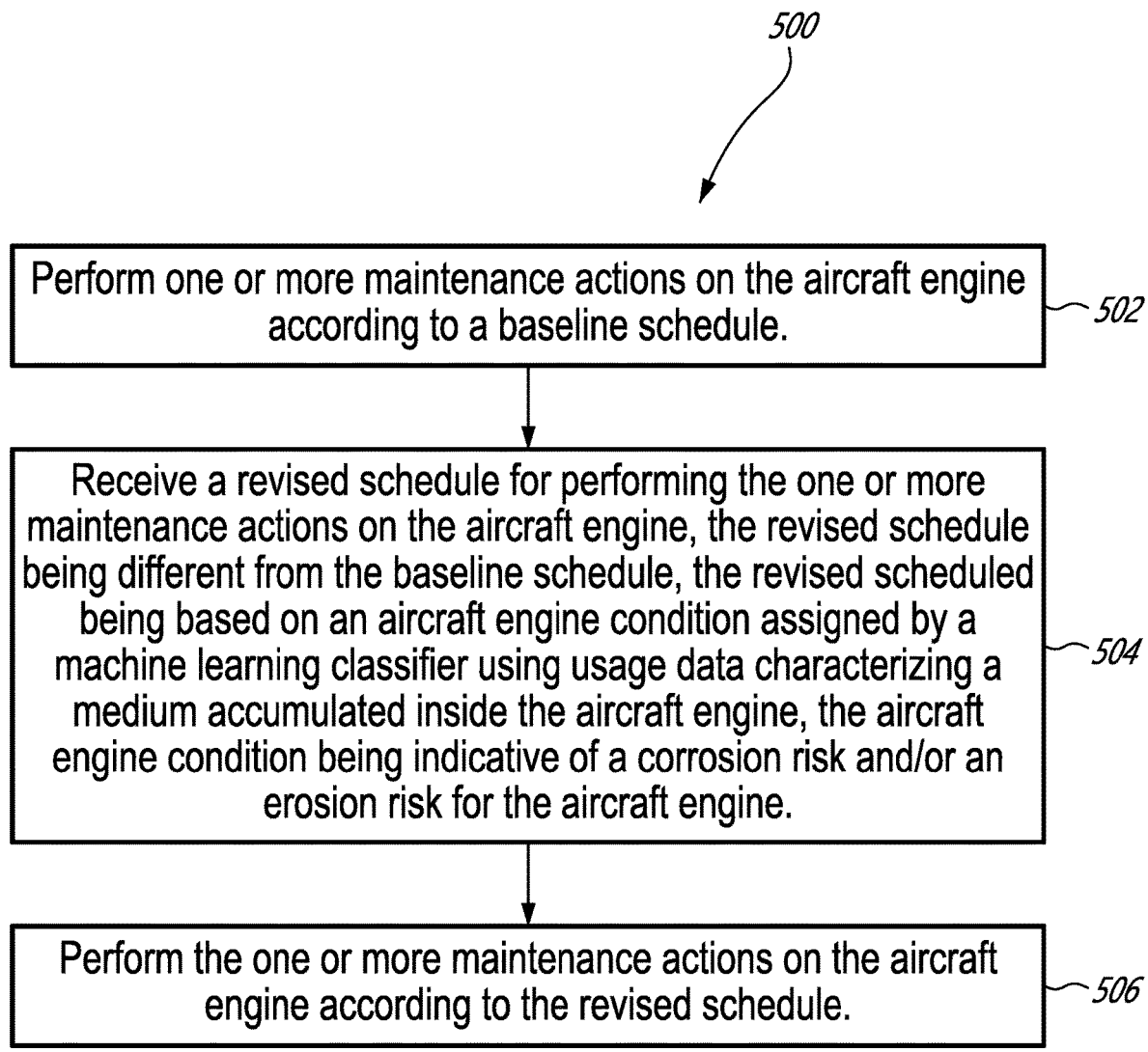

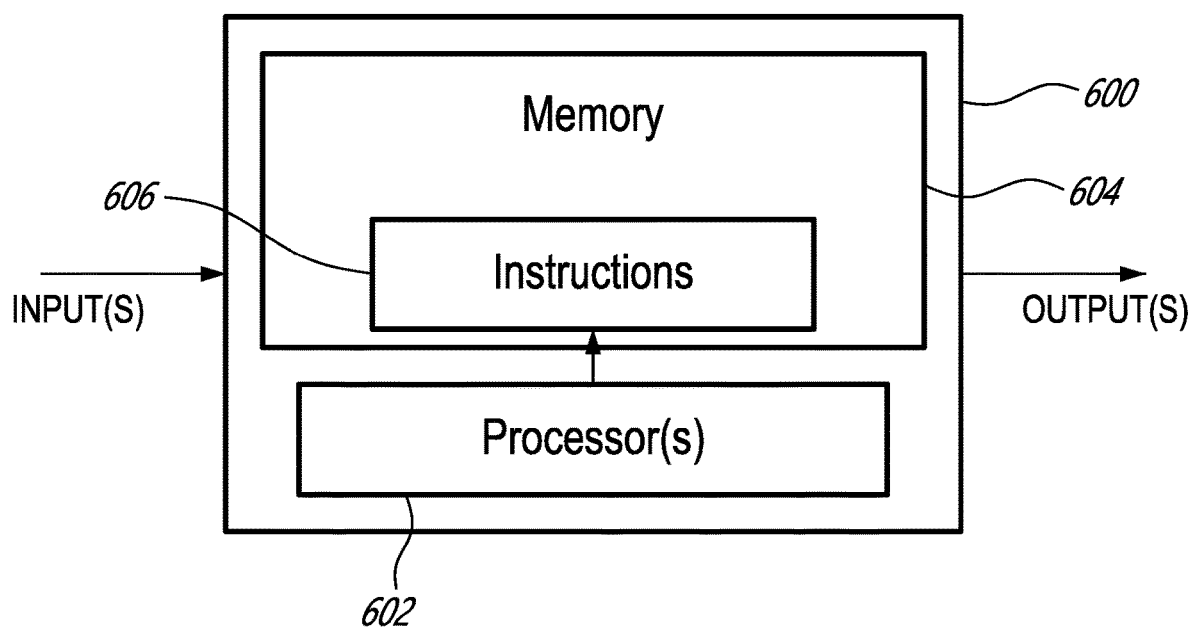

METHOD AND SYSTEM FOR MITIGATING CORROSION AND/OR EROSION IN AN AIRCRAFT ENGINE

TECHNICAL FIELD

The application relates generally to aircraft engines and, more particularly, to systems and methods for mitigating corrosion and/or erosion in such aircraft engines.

BACKGROUND OF THE ART

Aircraft engines may operate in a wide variety of conditions exposing the aircraft engines to rain, snow and sand for example. Engine components may be subjected to erosion and/or corrosion over time. Erosion may be caused by dust and sand being ingested by the engine whereas corrosion may be caused by salt being ingested by the engine. Improvement is desirable.

SUMMARY

In one aspect, the disclosure describes a method of mitigating one or more of corrosion and erosion in an aircraft engine. The method comprises:
receiving usage data characterizing a medium accumulated inside the aircraft engine;
using a trained model, relating the usage data to an assigned aircraft engine condition from a plurality of aircraft engine conditions, the trained model being trained using machine learning and historical data relating characteristics of the medium to the plurality of aircraft engine conditions; and
performing one or more of the following:
when the assigned aircraft engine condition is indicative of a corrosion risk for the aircraft engine, initiating a corrosion-mitigating action for the aircraft engine; and
when the assigned aircraft engine condition is indicative of an erosion risk for the aircraft engine, initiating an erosion-mitigating action for the aircraft engine.

In another aspect, the disclosure describes a method of mitigating corrosion and/or erosion in an aircraft engine. The method comprises:
performing one or more maintenance actions on the aircraft engine according to a baseline schedule;
receiving a revised schedule for performing the one or more maintenance actions on the aircraft engine, the revised schedule being different from the baseline schedule, the revised scheduled being based on an aircraft engine condition assigned by a machine learning classifier using usage data characterizing a medium accumulated inside the aircraft engine, the aircraft engine condition being indicative of a corrosion risk and/or an erosion risk for the aircraft engine; and
performing the one or more maintenance actions on the aircraft engine according to the revised schedule.

In a further aspect, the disclosure describes a system for mitigating one or more of corrosion and erosion in an aircraft engine. The system comprises:
one or more data processors;
non-transitory machine-readable memory storing instructions executable by the one or more data processors and configured to cause the one or more data processors to:
receive usage data characterizing a medium accumulated inside the aircraft engine;
use a trained model to relate the usage data to an assigned aircraft engine condition from a plurality of aircraft engine conditions, the model being trained using machine learning and historical data relating characteristics of the medium to the plurality of aircraft engine conditions; and
generate, based on the assigned aircraft engine condition, an output indicating that one or more of a corrosion-mitigating action and an erosion-mitigating action are required.

DESCRIPTION OF THE DRAWINGS

Reference is now made to the accompanying figures in which:

FIG. 5 is a flow chart illustrating steps of another method of mitigating one or more of corrosion and erosion in the aircraft engine of FIG. 1; and FIG. 6 is a schematic representation of an exemplary computer via which use of the trained model may be implemented.

DETAILED DESCRIPTION

Figure 1:
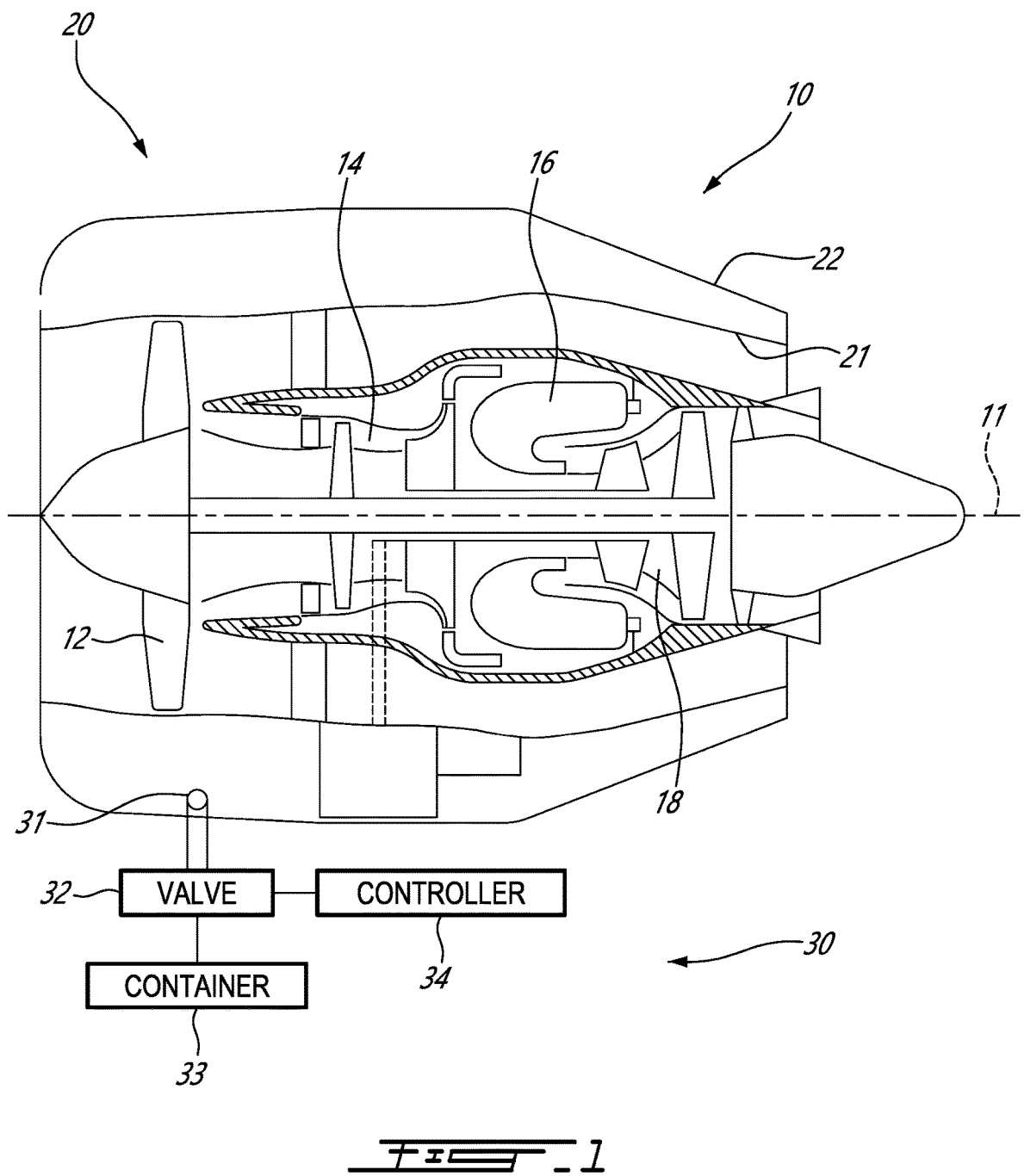
FIG. 1 is a schematic cross-sectional view of an aircraft engine depicted as a gas turbine engine as an example.

FIG. 1 illustrates an aircraft engine 10 depicted as a gas turbine engine of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although illustrated as a turbofan engine, the aircraft engine 10 may alternatively be another type of engine, for example a turboshaft engine or a turboprop engine. In addition, although the aircraft engine 10 is described herein for flight applications, it should be understood that aspects of the present disclosure may be suitable for (e.g., gas turbine) engines for industrial or other applications.

In the embodiment shown, the aircraft engine 10 includes a nacelle 20 and a medium collection system 30. The medium collection system 30 is shown outside of the nacelle 20 for clarity but may be located inside the nacelle 20 (e.g., between inner and outer cases 21, 22 of the nacelle 20). The medium collection system 30 includes a drain port 31 that may be located at a lower elevation on the aircraft engine 10. The drain port 31 may be fluidly connected to other components of the aircraft engine 10 to drain a medium accumulated inside the aircraft engine 10 during operation (e.g., during one or more flights) or during an engine wash. For instance, this medium may include water entering the compressor section 14 and drained out of the compressor section 14 via suitable conduits and the drain port 31. The drain port 31 may be fluidly connected to a valve 32, which is itself fluidly connected to a container 33. In other words, the drain port 31 may be fluidly connected to the container 33 through the valve 32. The valve 32 may have a closed configuration in which fluid communication between the drain port 31 and the container 33 is blocked and one or more open configurations as will be described below. The valve 32 may be operatively connected to a controller 34 which may control opening and closing of the valve 32. The valve 32 may be a servo valve or connected to an actuator to control the opening and closing of the valve 32. In some embodiments, the valve 32 may be manually operable by maintenance personnel for example. Although not shown, an overflow conduit may be connected to the drain port 31 to evacuate extra medium (e.g., environmental water) accumulated beyond the capacity of the container 33 when the container 33 is full. According to some embodiments, the container 33 is located within the nacelle 20 between the inner and outer cases 21, 22. However, it is understood that the container 33 can be located at any other suitable locations.

A factor affecting the integrity of metal components of the aircraft engine 10 during their operating life cycles is the environment in which the aircraft engine 10 operates. Corrosion and/or erosion may occur when a component operates in an environment which contains chemical substances and/or erosive particles. For example, operating in an environment with chloride, saline, sulphone, sand, dust, etc. may increase the risk of corrosion and erosion for aircraft engine 10. Existence of such substances in addition to pH level, the amount of water, and high temperature operating condition may promote corrosion (or sulfidation) and/or erosion.

To mitigate the effects of corrosion and/or erosion on engine components, there are maintenance and design aspects that may be considered. For example, aircraft engines may be subjected to corrosion and erosion mitigation actions to alleviate effects of the environment in which the engines are operated. For instance, inspections, component replacements, and/or engine washes are possible corrosion and/or erosion mitigation actions that can be taken. As some aircraft engines may be used globally, they are exposed to different environments, and their operating environments may constantly change during their life cycle. Therefore, the mitigation actions for preventing or mitigating these conditions may need to be planned with regards to all those environmental conditions. If the mitigation actions are too conservative, they may unnecessarily incur extra costs. On the other hand, if the mitigation actions are too optimistic, they may impact the reliability of the aircraft engine 10.

The present disclosure relates to methods and systems for mitigating one or more of corrosion and erosion of an aircraft engine, such as the aircraft engine 10 of FIG. 1. In use or during an engine wash, a medium (e.g., mainly liquid) may be accumulated in the aircraft engine 10. This medium may come from an environment in which the aircraft engine 10 is operated and/or a washing fluid used to wash the aircraft engine 10. In other words, one or more characteristics of the accumulated medium may be indicative of the environment in which the aircraft engine 10 was operated. When the accumulated medium originates mainly from the environment within which the aircraft engine 10 is operated, the medium may include water from rain, snow, ice or from the moisture content of the air ingested into the aircraft engine 10.

The medium may also include other constituents including soluble particles and insoluble particles. The soluble particles may include, for instance, chloride, saline and/or sulphone. The insoluble particles may include, for instance, sand and dust. When the aircraft engine 10 is in operation, these particles are ingested into the aircraft engine 10 and some of the particles may flow through the aircraft engine 10. In rainy conditions, water may also be ingested by the aircraft engine 10. This water may itself contain some constituents indicative of the environment in which the aircraft engine 10 is operating and/or may entrain some constituents already present within the aircraft engine 10 and/or in suspension in the air. The environmental water flowing through the aircraft engine 10 may thus see its constituent content increase as it interacts the different components of the aircraft engine 10. Moreover, a high relative humidity environment may result in water condensation on some components of the aircraft engine 10. This water, which is initially in gaseous form, may condensate as it contacts a component of the aircraft engine 10 and continues to flow through the aircraft engine 10 in a liquid form. In so doing, this condensed water may pick up constituents from the different components of the aircraft engine 10 and/or from particles in suspension in the air.

Aircraft engine 10 may have a drain port 31 to evacuate such medium (e.g., water and other constituents) that may have accumulated into a region of the aircraft engine 10, from rain, from condensation or from an engine wash for example. The medium collection system 30 may be used to collect some of the accumulated medium after or during operation of the aircraft engine 10. The valve 32 may be used to adjust a flow rate at which the accumulated medium enters into the container 33. Adjusting the valve 32 to a certain setting (e.g., flow rate) may give a means to determine the time the aircraft engine 10 was exposed to a specific environmental condition. By having the adjusted flow rate and the accumulated medium volume in the container 33, the exposure time to a particular environmental condition may be determined. The container 33 therefore contains a sample of medium that is representative of the environmental medium ingested by the aircraft engine 10 while in operation. The container 33 may be removable and/or replaceable. The container 33 may be sent to a lab for further analysis of the collected medium as will be further described below.

Predefined thresholds for amounts of water entering the aircraft engine 10, chemical contents (sulfuric and chloric combinations), pH level, exposure time, salt, particles (e.g., sand, dust), etc. may be determined. For example, for each engine model there may be thresholds for each items listed above and/or for other items. If it is determined that one or more of these thresholds are surpassed, one or more corrosion and/or erosion mitigation action(s) may be required. For instance, it may be determined that the salt concentration is above a given threshold at which one or more components may be prone to corrosion. A corrosion-mitigating action for the one or more components may be initiated and undertaken. The corrosion and/or erosion mitigation actions may include, for instance, maintenance actions such as inspection of the component(s), replacement of the component(s), an engine wash, or any other preventative or remedial actions. The trend of amount of this environmental medium entering the aircraft engine 10 while in operation, which may include water, chemical constituents (sulfuric and chloric combinations), pH level, exposure time, salt, particles (e.g., sand, dust), etc., may be monitored to trigger any required preventive actions.

These thresholds may be determined by recording, over a given period of time (e.g., given number of hours of flights, given number of flights, etc.), the amounts (e.g., concentrations) of the different constituents from samples of medium that are periodically collected, and number of instances of corrosion and/or erosion events observed. For instance, these thresholds may be determined during testing and/or during operation of aircraft engines of a fleet of aircraft for example. The aircraft engines may be used as part of their normal operations and samples of the environmental medium may be collected periodically (e.g., given number of hours of flights, given number of flights, etc.) during a learning phase. Engine inspections may also be carried out when the samples of medium are collected to indicate the need for corrosion and/or erosion mitigation actions associated with the respective samples. The corrosion and erosion mitigation actions may be performed as prescribed at a nominal frequency, which may be the same for all of the aircraft engines 10 of the fleet. During this learning phase, instances of corrosion and/or erosion events may be recorded and associated with the characteristics (e.g., concentrations of the constituents) of the samples of medium collected. It may therefore be possible to associate some parameters (e.g., concentration of a given constituent) with specific corrosion and/or erosion events. As an example, an inspection may be performed as scheduled at the nominal frequency and may reveal that corrosion of a given component is beyond an acceptable level for the number of hours it has been used. Then, the premature wear of this component via corrosion may be associated with a given concentration of salt in the samples collected. It may then be determined that earlier replacement of this component is required if a salt concentration in the collected samples is above or at this given concentration. These data may be consolidated from all engines of the fleet.

These samples indicative of the environmental medium ingested by the aircraft engine 10 while in operation may be collected at a given frequency (e.g., intervals of 100 hours of operation) that may be greater than an estimated frequency of replacement of a component subjected to corrosion and/or erosion (e.g., intervals of 1000 hours of operation). In other words, a component may be expected to be replaced after a given number of hours of operation before exhibiting corrosion and/or erosion under relatively harsh conditions. The collecting of the samples may be performed more frequently than the frequency of replacement of this component. For example, if the component is expected to last 1000 hours during operation under conditions critical for corrosion and/or erosion, the samples may be collected at each "X" number of hours, where "X" is smaller than 1000. This may ensure that the component does not experience a corrosion or erosion event before the first sample is even collected.

The samples collected may then be analyzed using any suitable techniques to determine, for instance, their chemical contents (e.g., sulfuric and chloric combinations), PH level, sand content, other particles content (e.g., dust), exposure time from the volume of the samples, and so on. The analysis may include, for instance, a spectroscopy analysis of the sample, titration, filtering of insoluble particles from the medium, a deposit analysis of the sample, exposing the sample to (e.g., pH indicator) strips configured to change color when a concentration of a given constituent is at or above a given threshold, and so on. These analyses may be performed off-site, such as in a lab.

Figure 2:
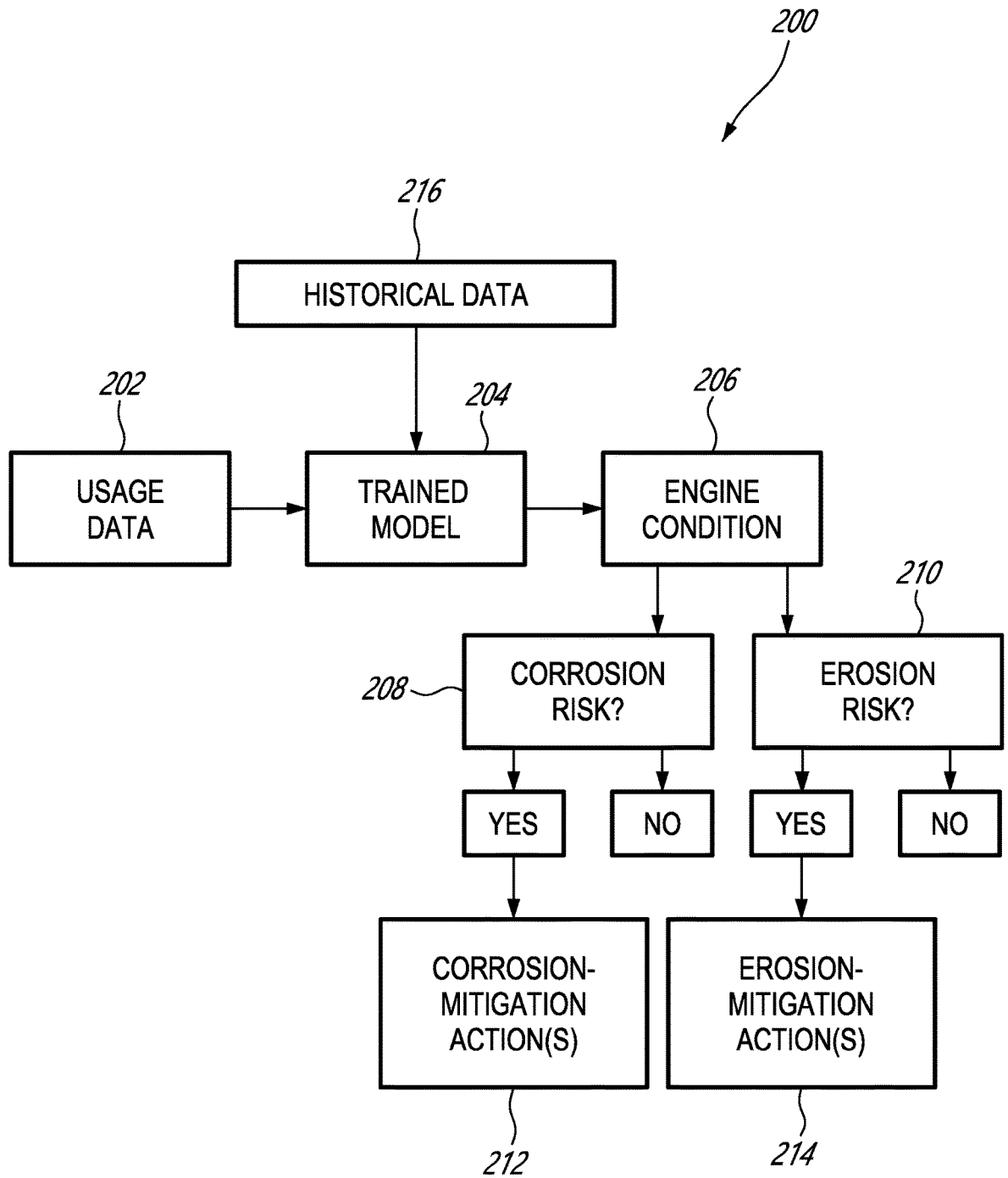
FIG. 2 is a schematic representation of an exemplary corrosion and/or erosion mitigation system.

Referring to FIG. 2, a corrosion and erosion mitigation system is shown at 200. The system 200 uses usage data 202 fed to a trained model 204 to generate an engine condition 206 indicative of a corrosion risk 208 and/or of an erosion risk 210. The usage data 202 characterize a medium accumulated inside the aircraft engine 10. This medium may be accumulated inside the aircraft engine 10 during operation of the aircraft engine 10 and/or may be accumulated inside the aircraft engine 10 during a wash of the aircraft engine 10. These usage data 202 may include, for instance, one or more of an amount (e.g., concentration) of one or more constituents of the medium, and/or a pH level of the medium. The one or more constituents may include soluble particles such as chloride, saline, and sulphone. The one or more constituents may include insoluble particles such as sand and dust.

If the engine condition 206 is indicative of the corrosion risk 208, one or more corrosion-mitigating action(s) 212 may be initiated and undertaken. If the engine condition 206 is indicative of the erosion risk 210, one or more erosion-mitigating action(s) 214 may be initiated undertaken. If the engine condition 206 is indicative of both the corrosion risk 208 and the erosion risk 210, both of the corrosion-mitigating action(s) 212 and the erosion-mitigating action(s) 214 may be initiated and undertaken. In some situations, one action such as a part replacement may be both corrosion-mitigating and erosion-mitigating for the aircraft engine 10. In some situations, the corrosion-mitigating action(s) 212 and the erosion-mitigating action(s) 214 may be different actions. For example, the corrosion-mitigating action 212 may include an engine wash, and the erosion-mitigating action 214 may include a part replacement.

In some embodiments, the trained model 204 may perform a multi-label classification task using a suitable classification algorithm. For example, the engine condition 206 outputted by the trained model 204 may be a suitable class label assigned to the usage data 202 (i.e., the input). For example, based on the usage data 202, the trained model 204 may assign as an output one of a plurality of possible engine conditions 206. In some embodiments, respective engine conditions 206 may be indicative of: (1) a corrosion risk; (2) an erosion risk; (3) both a corrosion and an erosion risk; or (4) neither a corrosion nor an erosion risk.

Figure 3:
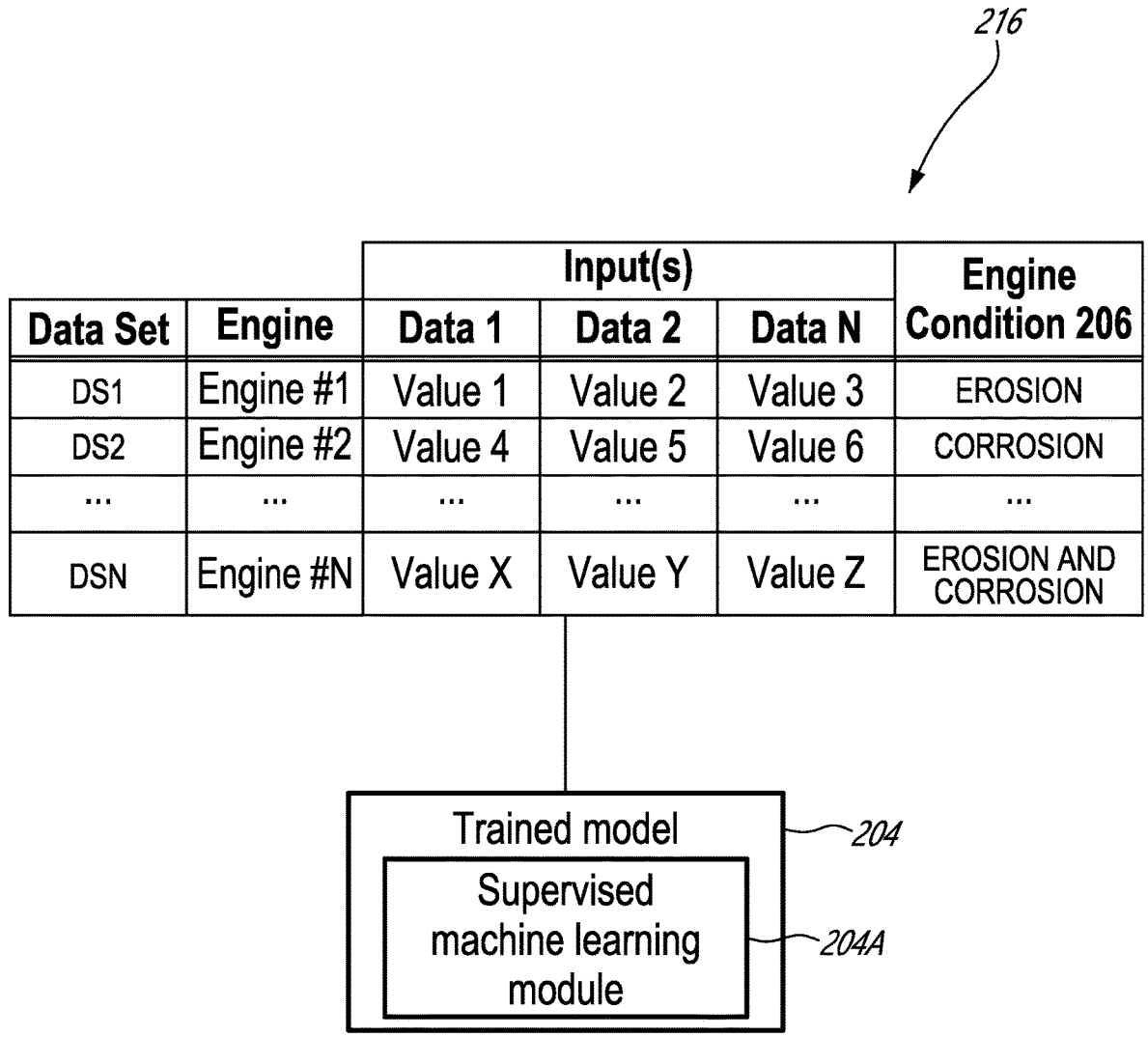
FIG. 3 is a schematic representation of historical data used to train a trained model of the system of FIG. 2 using machine learning.

Referring to FIG. 3, the trained model 204 may be trained using historical data 216 of a plurality of aircraft engines (e.g., of a fleet of aircraft). A suitable type of (e.g., classification) trained model may be constructed according to example embodiments of the present disclosure. For instance, a random forest (RF) model and/or a neural network (NN) model may be constructed. In some embodiments, non-linear regression with or without regularization may be used. In some embodiments, one or more of gradient boost machine, artificial neural network, self-organizing maps, and/or deep learning may be used. In some embodiments, a RF regression model of corrosion and erosion data may be constructed.

In the present embodiment, the trained model 204 may be trained using one or more supervised learning algorithms. Such supervised learning algorithm(s) may build a mathematical model of a set of data that contains both the inputs and the desired outputs. The data is known as training data, and consists of a set of training examples (e.g., data sets). Each training example has one or more inputs and the desired output, also known as a supervisory signal. In the mathematical model, each training example may be represented by an array or vector, sometimes called a feature vector, and the training data is represented by a matrix. Through iterative optimization of an objective function, the supervised learning algorithm(s) may learn a function that can be used to predict the output associated with new inputs. An optimal function may allow the algorithm to correctly determine the output for inputs that were not a part of the training data. An algorithm that improves the accuracy of its outputs or predictions over time is said to have learned to perform that task.

Types of supervised-learning algorithms include active learning, classification and regression. Classification algorithms are used when the outputs are restricted to a limited set of values, and regression algorithms are used when the outputs may have any numerical value within a range. In the present case, a suitable classification algorithm may be used to output a suitable class label (e.g., one of four possible class labels) for the usage data 202.

As shown in FIG. 2, the trained model 204 is trained using the historical data 216, which may also be referred to as "training data". As shown in FIG. 3, the historical data 216 includes a plurality of data sets identified as DS1, DS2 and DSN and each including one or more values (e.g., characteristics, parameters) that are labelled "Data 1", "Data 2", "Data N" in FIG. 3. These values may characterize the medium accumulated inside the aircraft engine 10 and subsequently collected. These values may correspond to the concentration or other characteristic(s) of the one or more constituents of the medium, a pH level of the medium, a quantity (e.g., volume) of the medium collected and so on. As aforementioned, the one or more constituents may include soluble particles such as chloride, saline, and sulphone. The one or more constituents may include insoluble particles such as sand and dust.

Each of the data sets DS1, DS2 and DSN is associated with a determination (i.e., engine condition 206) of whether the given aircraft engine 10 is at a higher risk of corrosion and/or erosion. Typically, the determination of whether or not the aircraft engine 10 is at risk of corrosion and/or erosion may be done via a (e.g., visual, borescope) inspection of the aircraft engine 10. Therefore, for each data set DS1, DS2 and DSN, maintenance personnel may inspect the applicable aircraft engine 10 to find signs of erosion and/or corrosion on the aircraft engine 10. The medium accumulated in the aircraft engine 10 is also analyzed to determine its characteristics, such as the concentration of the one or more constituents of the medium, a pH level of the medium, and so on. The different values (e.g., Data 1, Data 2, ..., Data N) characterizing the medium and resulting (i.e., engine condition 206) data regarding erosion and corrosion are recorded and supplied to the trained model 204 as the historical data 216 for training the trained model 204. The data regarding corrosion and erosion may include a determination that the engine is at risk of corrosion and/or erosion and/or may include a determination that one or more components of the engine are exhibiting corrosion and/or erosion.

The historical data 216 therefore contains all the data characterizing the medium accumulated into each aircraft engine 10 (e.g., of the fleet) and contains all of the associated data (output engine conditions 206) about the presence or risk of erosion and corrosion of each of those aircraft engines. The historical data 216 is then fed into the trained model 204 that will "learn" to output an engine condition 206 based on the usage data 202 characterizing the medium and inputted into the trained model 204 during use. A suitable number of data sets DS1, DS2 and DSN may be selected based on the type of trained model 204 used and the number of values used in each data set DS1, DS2 and DSN for example.

Figure 4:
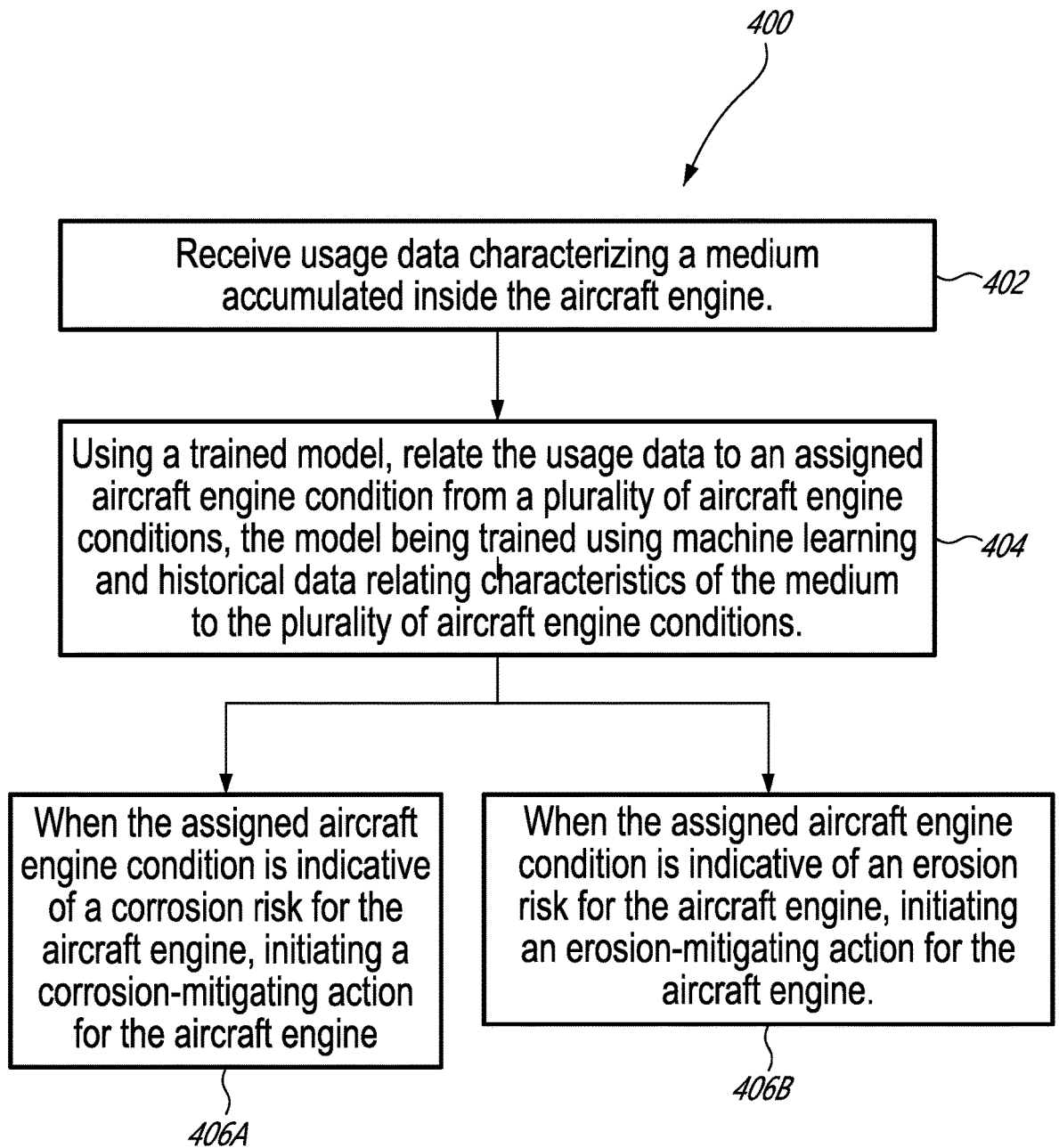
FIG. 4 is a flow chart illustrating steps of a method of mitigating one or more of corrosion and erosion in the aircraft engine of FIG. 1.

Referring now to FIG. 4, a method of mitigating one or more of corrosion and erosion in the aircraft engine 10 is shown at 400. Method 400 may be performed using system 200 or other system. Method 400 may include other actions including those disclosed herein. The method 400 includes: receiving the usage data 202 characterizing the medium accumulated inside the aircraft engine 10 at 402; using the trained model 204, relating the usage data 202 to the assigned aircraft engine 10 condition 206 from a plurality of aircraft engine conditions 208, 210, the trained model 204 being trained using machine learning and the historical data 216 relating characteristics of the medium to the plurality of aircraft engine conditions 208, 210 at 404; and performing one or more of: when the assigned aircraft engine condition 208 is indicative of a corrosion risk for the aircraft engine 10, initiating a corrosion-mitigating action 212 for the aircraft engine 10 at 406A; and when the assigned aircraft engine condition 210 is indicative of an erosion risk for the aircraft engine 10, initiating an erosion-mitigating action 214 for the aircraft engine 10 at 406B.

Initiating the corrosion-mitigating action 212 and/or the erosion-mitigating action 214 may include generating an output indicative of such action(s) being required in view of the corrosion and/or erosion risk for example. Initiating an action may include identifying the action and an associate time at which to perform the action. Initiating the action may include alerting an aircraft operator and/or maintenance personnel of a need to perform the action.

As aforementioned, the medium may be accumulated inside the aircraft engine 10 during operation of the aircraft engine 10 and/or be accumulated inside the aircraft engine 10 during a wash thereof.

As shown in FIG. 3, the historical data 216 relates characteristics of media collected from the plurality of aircraft engines of the fleet to the aircraft engine conditions 206. The historical data 216 may be used to train the trained model 204 by feeding the historical data 216 into a supervised machine learning module 204A of the trained model 204. As described above, this supervised machine learning module 204A uses supervised learning algorithms by which it builds a mathematical model from a set of data (e.g., historical data 216) that contains both the inputs (e.g., concentration of constituents, pH level, etc) and the desired outputs (e.g., engine conditions 206). Through iterative optimization of an objective function, the supervised machine learning module 204A learns a function that can be used to predict the output associated with new inputs. An optimal function will allow the trained model 204 to correctly determine the output for inputs that were not a part of the historical data 216.

The trained model 204 may therefore be a machine learning classifier that is trained to process the usage data 202 and to classify the aircraft engine 10 associated with these usage data 202 as being either susceptible to corrosion, susceptible to erosion, or susceptible to both corrosion and erosion.

The corrosion-mitigating action and/or the erosion-mitigating action undertaken at 406A and 406B may include one or more of an inspection, a replacement of one or more components of the aircraft engine 10, and an engine wash.

As afore mentioned, the usage data 202 may include one or more of a concentration of one or more constituents of the medium and a pH level of the medium. The one or more constituents may include one or more of soluble particles, such as chloride, saline, and sulphone, and one or more insoluble particles such as sand and dust. Thus, the receiving of the one or more of the concentration of the constituents and the pH level includes generating the usage data 202 by analyzing the medium. This may include performing one or more of a spectroscopy analysis of the medium and a deposit analysis of the medium for example. The usage data 202 may be indicative of one or more environmental conditions associated with the accumulation of the medium into the aircraft engine 10. The usage data 202 may include an exposure time of the aircraft engine 10 to an environmental condition associated with the medium.

The method 400 may include collecting the medium into the container 33 (FIG. 1) that is fluidly connectable to the drain port 31 (FIG. 1) of the aircraft engine 10. The method 400 may include collecting the medium while the aircraft engine 10 is in operation. The usage data 202 may include an exposure time of the aircraft engine 10 to the medium. This exposure time may be based on a quantity of the medium accumulated inside the aircraft engine 10 or based on other characteristic(s) of the medium.

Referring now to FIG. 5, a method of mitigating corrosion and/or erosion in the aircraft engine 10 is shown at 500. Method 500 may be performed using system 200 or other system. Method 500 may include other actions disclosed herein. The method 500 includes: performing one or more maintenance actions (e.g., inspections, part replacements, adjustments, engine washes, overhaul) on the aircraft engine 10 according to a baseline schedule at 502; receiving a revised schedule for performing the one or more maintenance actions on the aircraft engine 10, the revised schedule being different from the baseline schedule, the revised scheduled being based on an engine condition 206 assigned by a machine learning classifier using usage data characterizing a medium accumulated inside the aircraft engine 10, the aircraft engine condition being indicative of a corrosion risk and/or an erosion risk for the aircraft engine 10 at 504; and performing the one or more maintenance actions on the aircraft engine 10 according to the revised schedule at 506.

The machine learning classifier may be part of the trained model 204 and operable to classify the usage data 202 characterizing the medium into one of a plurality of possible aircraft engine conditions 206 as explained above. One or more appropriate actions may be initiated and performed following the determination of the engine condition 206 by the machine learning classifier from the usage data 202.

The one or more maintenance actions may be subjected to a baseline schedule (e.g., each 1000 hours of flight). The baseline schedule may be based on certain assumptions regarding typical usage of the aircraft engine 10. However, the engine conditions 206 determined using method 500 may reveal an increased risk of corrosion and/or erosion and may require the revised schedule to be followed to perform the one or more maintenance actions instead of the baseline schedule. In some embodiments, the revised schedule may specify an increased frequency of some maintenance actions, and/or may include additional maintenance actions compared to the baseline schedule. In some embodiments, the revised schedule may specify a reduced frequency of some maintenance actions, and/or may include fewer maintenance actions compared to the baseline schedule. The one or more maintenance actions may be performed by maintenance personnel.

With reference to FIG. 6, an example of a computer 600 that may be part of the system 200 for mitigating the one or more of the corrosion and/or the erosion is illustrated. For example, the method 400 may be computer-implemented using the computer 600. The computer 600 comprises one or more data processors 602 and a memory 604 which has stored therein computer-executable instructions 606. Instructions 606 may incorporate trained model 204. The processor(s) 602 may comprise any suitable devices configured to implement the method 400 such that instructions 606, when executed by the computer 600 or other programmable apparatus, may cause the functions/acts/steps performed as part of the method 400 as described herein to be executed. The processor(s) 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processor(s) 602.

The methods and systems for mitigating corrosion and/or erosion described herein may be implemented in a high level procedural or object oriented programming or scripting language, or a combination thereof, to communicate with or assist in the operation of a computer system, for example the computer 600. Alternatively, the methods and systems for mitigating corrosion and/or erosion may be implemented in assembly or machine language. The language may be a compiled or interpreted language. Program code for implementing the methods and systems for mitigating corrosion and/or erosion may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for mitigating corrosion and/or erosion may also be considered to be implemented by way of a non-transitory computer-readable storage medium having a computer program stored thereon. The computer program may comprise computer-readable instructions which cause a computer, or more specifically the processor(s) 602 of the computer 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computers, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses. Substituting the physical hardware particularly configured to implement various acts for non-physical hardware, using mental steps for example, may substantially affect the way the embodiments work.

The term "connected" or "coupled to" may include both direct connection or coupling (in which two elements contact each other) and indirect connection or coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of mitigating one or more of corrosion and erosion in an aircraft engine, the method comprising:
   accumulating a medium inside the aircraft engine during operation of the aircraft engine and/or during a wash of the aircraft engine;
   receiving usage data characterizing the medium accumulated inside the aircraft engine, the usage data including one or more characteristics of the medium indicative of an environment in which the aircraft engine was operated;
   using a trained model, relating the usage data to an assigned aircraft engine condition from a plurality of aircraft engine conditions, the trained model being trained using machine learning and historical data relating characteristics of the media collected from a plurality of aircraft engines to the plurality of aircraft engine conditions; and
   performing one or more of the following:
     when the assigned aircraft engine condition is indicative of a corrosion risk for the aircraft engine, initiating a corrosion-mitigating action for the aircraft engine; and
     when the assigned aircraft engine condition is indicative of an erosion risk for the aircraft engine, initiating an erosion-mitigating action for the aircraft engine.

2. The method of claim 1, wherein the medium is accumulated inside the aircraft engine during operation of the aircraft engine.

3. The method of claim 1, wherein the medium is accumulated inside the aircraft engine during a wash of the aircraft engine.

4. The method of claim 1, wherein the plurality of aircraft engine conditions are indicative of inspection results respectively associated with the characteristics of the media.

5. The method of claim 1, wherein the assigned aircraft engine condition is indicative of both the corrosion risk and the erosion risk for the aircraft engine.

6. The method of claim 1, wherein the trained model includes a classification algorithm.

7. The method of claim 1, wherein the corrosion-mitigating action and/or the erosion-mitigating action include one or more of an inspection, a replacement of one or more components of the aircraft engine, and an engine wash.

8. The method of claim 1, wherein the usage data is indicative of an amount of a constituent of the medium.

9. The method of claim 8, wherein the constituent includes a soluble particle.

10. The method of claim 8, wherein the constituent includes any one of chloride, saline, and sulphone.

11. The method of claim 8, wherein the constituent includes sand or dust.

12. The method of claim 1, comprising collecting the medium in a container fluidly connectable to a drain port of the aircraft engine.

13. The method of claim 12, comprising analyzing the medium to generate the usage data.

14. The method of claim 13, wherein analyzing the medium includes performing one or more of a spectroscopy analysis of the medium and a deposit analysis of the medium.

15. The method of claim 1, wherein the usage data includes a pH level of the medium.

16. The method of claim 1, wherein the usage data includes an exposure time of the aircraft engine to the environment associated with the medium.

17. The method of claim 16, comprising determining the exposure time based on a quantity of the medium accumulated inside the aircraft engine.

18. The method of claim 1, comprising:
   performing an engine wash of the aircraft engine when the assigned aircraft engine condition is indicative of a corrosion risk for the aircraft engine; and
   replacing a component of the aircraft engine when the assigned aircraft engine condition is indicative of an erosion risk for the aircraft engine.

19. A system for mitigating one or more of corrosion and erosion in an aircraft engine, comprising:
   a container configured to collect medium accumulated inside the aircraft engine during operation of the aircraft engine and/or during a wash of the aircraft engine;
   means for generating usage data by analyzing the medium collected in the container, the usage data including one or more characteristics of the medium indicative of an environment in which the aircraft engine was operated;
   one or more data processors;
   non-transitory machine-readable memory storing instructions executable by the one or more data processors and configured to cause the one or more data processors to:
     receive the usage data;
     use a trained model to relate the usage data to an assigned aircraft engine condition from a plurality of aircraft engine conditions, the model being trained using machine learning and historical data relating characteristics of the medium to the plurality of aircraft engine conditions; and
     generate, based on the assigned aircraft engine condition, an output indicating that one or more of a corrosion-mitigating action and an erosion-mitigating action are required.

20. The system of claim 19, wherein:
the container is connectable to a drain port of the aircraft engine; and
the system includes a valve operable to adjust a flow rate at which the medium enters the container via the drain port.

* * * * *